(12) United States Patent
Rosenberg

(10) Patent No.: US 6,304,567 B1
(45) Date of Patent: Oct. 16, 2001

(54) METHODS AND APPARATUS FOR PROVIDING VOICE COMMUNICATIONS THROUGH A PACKET NETWORK

(75) Inventor: Jonathan David Rosenberg, Morganville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 08/959,794

(22) Filed: Oct. 29, 1997

Related U.S. Application Data
(60) Provisional application No. 60/032,031, filed on Nov. 26, 1996.

(51) Int. Cl.[7] .................................................. H04L 12/66
(52) U.S. Cl. ........................... 370/356; 370/352; 370/401
(58) Field of Search ..................................... 370/352, 353, 370/354, 355, 356, 401, 474, 475, 476, 466, 467, 537, 538, 539; 379/88.17, 93.01

(56) References Cited

U.S. PATENT DOCUMENTS 4,771,425 * 9/1988 Baran et al. .
5,274,635 * 12/1993 Rahman et al. .
5,608,786 * 3/1997 Gordon .

OTHER PUBLICATIONS

H. Schulzrinne, S. Casner, R Frederick, V. Jacobson, "RTP: A Transport Protocol for Real–Time Applications", Audio Visual Working Group Request for Comments RFC 1889, IETF, Jan. 1996.
H. Schulzrinne, "RTP Profile for Audio and Video Conferences with Minimal Control", Audio Visual Working Group Request for Comments RFC 1890, IETF, Jan. 1996.

* cited by examiner

Primary Examiner—Huy D. Vu
(74) Attorney, Agent, or Firm—Priest & Goldstein, PLLC

(57) ABSTRACT

A communications system multiplexes voice communications signals onto one or more transport level connections established through a packetized network, such as the Internet. The invention supports the use of variable-length packets and accommodates variable jitter. The system conforms to real time protocol (RTP) and employs internet telephone gateways (ITGs) to bind users to channel identifiers, to indicate payload type and length, to provide channel identification and time stamps, and to indicate cessation and resumption of voice traffic from a particular user through use of, for example, marker bits.

11 Claims, 5 Drawing Sheets

METHODS AND APPARATUS FOR PROVIDING VOICE COMMUNICATIONS THROUGH A PACKET NETWORK

This application claims the benefit of U.S. Provisional Application No. 60/032,031, filed Nov. 26, 1996.

BACKGROUND OF THE INVENTION

1. Field of the Invention

The present invention relates generally to network systems and methods which provide voice communications through a packet network, and more specifically, to network systems and methods for providing efficient voice communication through a packet network such as the Internet.

2. Description of the Related Art

A conventional telephone network 100 is illustrated in FIG. 1 and comprises, inter alia, a plurality of toll offices, such as toll offices (TS) 105 and 110, that may be interconnected to one another to provide long distance voice and data communications for subscribers, such as the telephone users, associated with station sets S1 and S2. The manner in which a telephone user, for example, the user associated with the station S1, establishes via network 100 a telephone connection to another such user, for example, the user associated with the station S2, is well known and will not be described in detail herein. However, it suffices to say that a telephone user, hereinafter also a subscriber, may establish such a connection by causing the station S1 to go off hook and then dialing the telephone number associated with the station to which he wishes to connect, such as the station S2. Local central office 50 associated with station S1 collects the telephone digits as they are dialed and establishes a connection 101 to a network toll office, for example, toll office 105 which may also be referred to hereinafter as a toll switch. Toll office, or switch 105, in turn, and based on the dialed telephone number that it receives from the local central office 50, establishes a connection 102 to a so-called destination toll switch, such as toll switch 110. Destination toll switch 110, in turn, extends the connection to central office 75 associated with the station S2 and passes to that office the dialed telephone number. The latter central office responsive to receipt of the dialled digits then extends the connection 103 to station S2. The subscribers positioned respectively at stations S1 and S2 may then begin to speak to one another via the established connection.

Since the charges for long distance services, that is, for connections such as the link between toll switches 105 and 110, typically amount to several dollars for every hour of connection time, lower-cost alternatives would be highly desirable. With the growth of the Internet and the increasing sophistication of Internet subscribers, the Internet could be employed to provide the long distance portion of such a telephone call. Since Internet access is often provided for a few tens of dollars per month, employing the Internet in this manner could save a frequent user hundreds of dollars per month. Even though the Internet is a relatively lossy medium due to the system overheads from uncontrolled access, telephone connections of acceptable quality are possible. Current Internet-based long distance services permit a user to dial a local access number which connects the user to an Internet Telephone Gateway (ITG). The ITG prompts the user for a destination telephone number, then routes the call over the Internet to a similar device at the local exchange of the destination and the destination ITG dials the end user, thereby completing the link. Although such services permit an Internet user to establish a telephone call, using the Internet for the long distance portion of the call, current approaches tend to employ protocols to establish and tear down a new Internet connection with each individual call and the conventional Internet protocols used to establish telephone calls are relatively inefficient, requiring excessive overhead, because the protocols were established to provide extensive feature sets for digital communications links, not for voice communications which, with analog telephones operating at either endpoint, do not require and cannot use the feature sets. Additionally, voice communications at relatively low data-rates are supported by emerging system components. That is, new coder/decoders (codecs) are emerging which can support near toll-quality voice communications at only 8 kilobits per second (kbps) and acceptable quality at 4 kbps. These low data rate codecs can significantly reduce the cost of providing ITG services.

Consequently, it would be highly desirable to provide long distance telephone services over a packet network, such as the Internet, and to increase the efficiency of the connections thereby established while supporting low data rate voice communications. Additionally, voice applications are important for other packet networks, such as the connection of private branch exchanges or the connection of voice access switches by a packet network. Improvements in efficiency are highly desirable for these applications as well.

SUMMARY OF THE INVENTION

The present invention is directed to systems and methods which substantially improve the efficiency of voice communications over a packetized communications system such as the Internet. The invention supports the use of variable-length packets and accommodates variable jitter and loss. The invention also achieves increased efficiency, in part, by multiplexing voice signals into the same transport level connection and/or packet which, for the sake of convenience, will be referred to hereinafter as the Internet although it will be recognized that other networks may be employed. The system uses the real time protocol (RTP) and employs internet telephone gateways (ITGs) to bind users to channel identifiers, to indicate payload type and length, to provide channel identification and time stamps, and to indicate cessation and resumption of voice traffic from a particular user through use of, for example, marker bits. Additionally, the low overhead operation of the new system enhances the ability to support low data-rate voice communications. Since new codecs are emerging which can support near toll-quality voice communications at only 8 kilobits per second (kbps) and acceptable quality at 4 kbps, and these low data rate codecs can significantly reduce the cost of providing ITG services, the present invention's support of low data rate codecs provides an additional cost advantage. The invention also supports the transmission of very low bit rate (1 kbps or less) information, to improve the quality of communications by reproducing background noise during periods of silence.

These and other features, aspects, and advantages of the invention will be apparent to those skilled in the art from the following detailed description, taken together with the accompanying drawings.

DETAILED DESCRIPTION OF THE INVENTION

Figure 1:
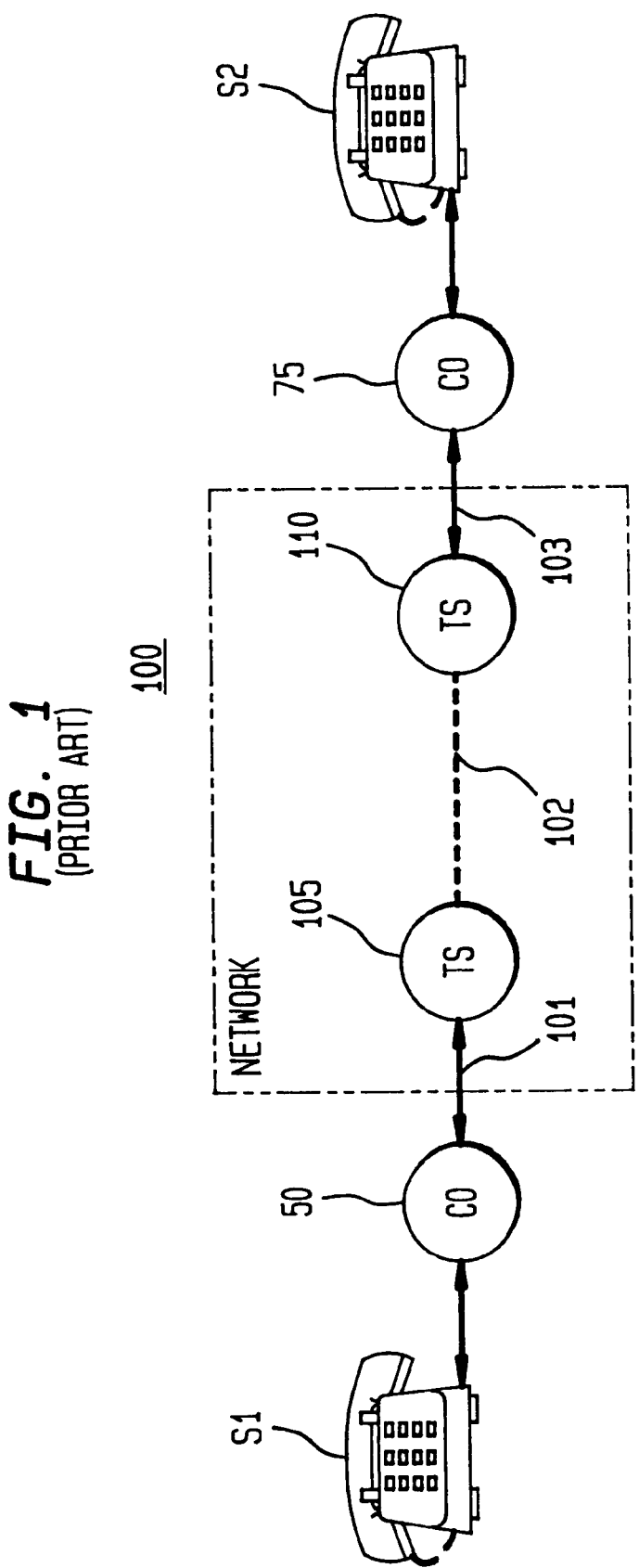
FIG. 1 is a block diagram of a conventional voice connection through a plain old telephone system (POTS) long distance connection.

The improved telephony system of the present invention substantially improves the efficiency of voice communications over a packet network communications system, such as the Internet, or any other packet based communications network, which interconnects private branch exchanges (PBXs) or voice access switches. In a presently preferred embodiment, the new system employs Internet telephone gateways (ITGs) to establish a long distance connection through the Internet between two ITG locations, such as New York and Los Angeles, for example. The voice calls between the gateways are then multiplexed into the same transport level connection and/or packet. Rather than establishing and tearing down a connection for each voice call, as conventional Internet voice communications systems do, the connection is established and maintained so long as voice calls are being made between the locations. The new system substantially increases the efficiency of such calls by employing new protocols which impose far less overhead on each call. Although new, the protocols conform to the real time protocol (RTP) standards set forth for operation on the Internet. Additionally, by multiplexing the calls between ITGs, a number of voice calls may be, and preferably will be, multiplexed into a single packet rather than using a separate connection and, thus, a separate packet for each call. Thus, the system advantageously realizes further significant increases in efficiency.

The inventive multiplexing system reduces overhead by increasing the effective payload without a corresponding penalty in packetization delay and, as more users are multiplexed, the payload from a particular user can be reduced in size, or the codec bitrate reduced, without an efficiency penalty. That is, in a conventional Internet telephony system, where links are established between ITGs on a call by call basis, each packet may typically include a forty byte header, even if there are only 20 bytes of payload, or voice data to be transmitted. The new multiplexing system permits considerably more payload to accompany each header. Another major benefit of the present multiplexing approach is that the scalability of the system is substantially improved. That is, as the number of users increases, the number of packets which arrive at the destination does not increase. Therefore, computations which are normally performed on a packet by packet basis, such as real time control protocol (RTCP) statistics collection, jitter accumulation, header processing, operating system context switching, and the like, do not increase.

In addition to improving efficiency, reducing delay, and improving scalability, both end-to-end delay and losses can be reduced. These reductions arise from the fact that as a user pauses in his speech, the data stream representing his digitized speech also pauses. With the new system, however, except in the unlikely event that all users stop speaking at the same time, other users multiplexed into the packet are not silent and packets will still be sent continuously. Consequently, the system can continuously generate delay estimates from the continuously arriving packets. The system employs this continuous stream of delay estimates, rather than delay estimates received just during talkspurts, as in the conventional case, to dynamically adapt playout buffers at each receiver thus ensuring a more efficient utilization with the present invention.

Figure 2A:
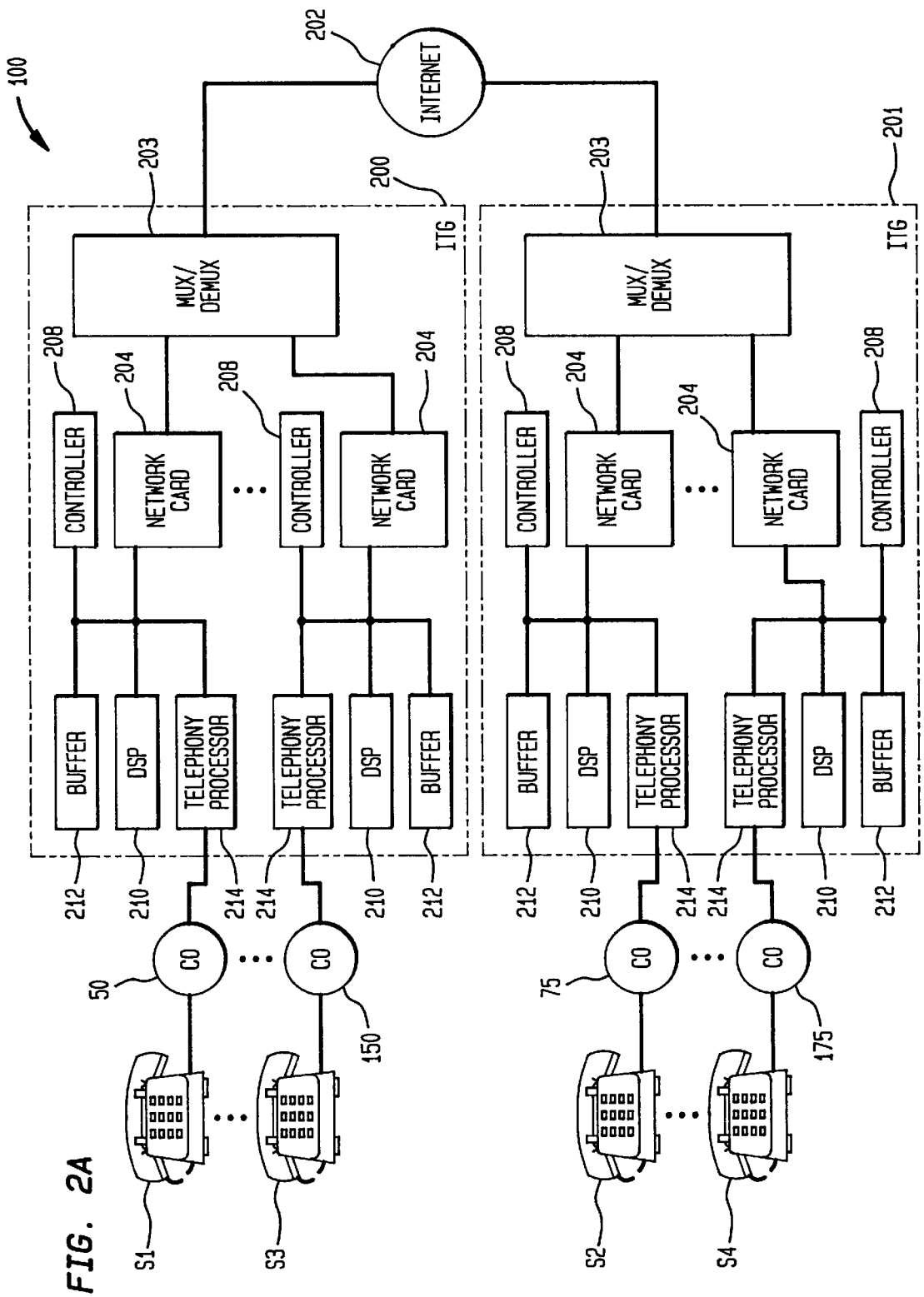
FIG. 2 is a block diagram of a multiplexed packetized voice communications system in accordance with the present invention.
Figure 2B:
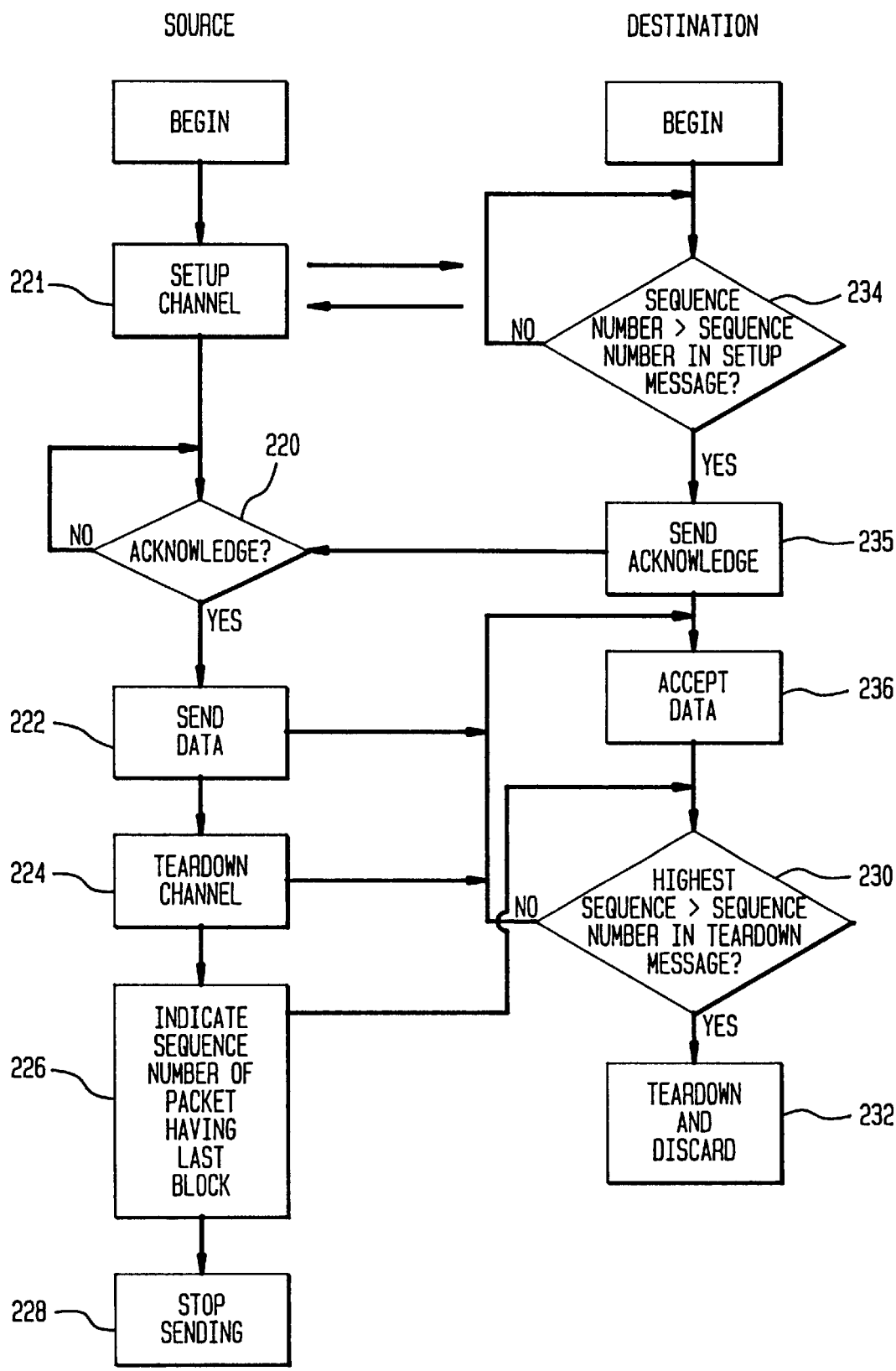

The block diagram of FIG. 2 provides a functional overview of a presently preferred embodiment of the telephone system 100 in accordance with the present invention. Stations S1 and S2 and central offices 50 and 75 are as described in relation to FIG. 1. Stations S3 and S4, and central offices 150 and 175 are similar to stations S1, S2 and central offices 50, 75, respectively. However, rather than being connected to one another through toll switches, as in the conventional long distance connection of FIG. 1, stations such as stations S1 and S2 are connected through ITGs 200 and 201 to a packet-based communication network 202, such as the Internet 202.

Each ITG 200 or 201 includes a network card 204 which is connected to the Internet 202 and, inter alia, provides the digital packets of multiplexed telephone calls which are passed onto the Internet 202. The new, multiplexed, packets are preferably organized as set forth in greater detail in relation to the discussion of FIGS. 5, 6, and 7 below. The network card 204 is also connected through a bus 206 to a controller 208 which oversees operation of the ITG, to a digital signal processor (DSP) 210 which provides filtering and compression of digitized voice signals, to a buffer 212 which "plays out" received telephone calls, and to a telephony processor 214 which terminates calls, processes signals and converts telephone signals from the sets S1–Sn between analog and digital form. The controller controls operation of a multiplexer/demultiplexer 203 which combines various voice messages onto a single connection and also controls operation of the playout buffer 212. In the new telephony system, a telephone call originating at station S1, for example, would be routed to a central office 50 and, from there, to an ITG 200, located, for example, in Los Angeles. At the source ITG 200 the telephone call from station S1 would be multiplexed with a telephone call from station S3, or another station, through the Internet 202 to another, destination, ITG 201, located in New York, for example, where the calls are demultiplexed, fed to a playout buffer 212 and, in the end, delivered by a telephony processor 214 to station S2 or S4. Once such a connection is established between ITGs, various users may be added to or deleted from the connection, with each user's virtual connection constituting a channel, but the connection's lifetime is terminated only when all users are disconnected from the system. In order that channels may be re-used when one user terminates a call each user is bound to a channel for the duration of their call.

Figure 3:
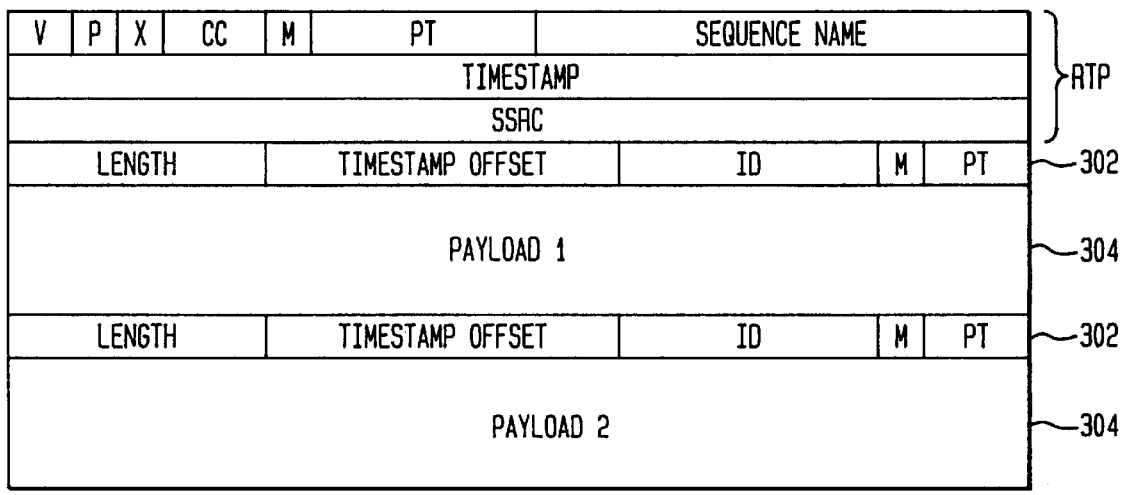
FIG. 3 is a block diagram depicting a packet format according to the preferred embodiment of the invention.

In the presently preferred embodiment, the new telephone system, 200 multiplexes a plurality of telephone calls using a new protocol exemplified by the packet format of FIG. 3. Each word of the packet is 32 bits wide and the first three words, the RTP header, conform with the real time protocol set forth in what is known as the RTP protocol. The RTP protocol is known in the art and discussed, for example, in H. Schulzrinne, S. Casner, R Frederick, F. Jacobson, RTP: A Transport Protocol for Real-Time Applications, Audio Visual Working Group Request for Comments RFC 1889, IETF, January 1996, and in H. Schullzrinne, "RTP Profile for Audio and Video Conferences with Minimal Control", Audio Visual Working Group Request for Comments RFC 1890, IETF, January 1996, which are incorporated by reference herein in their entirety. The new protocol provides for the communication of a plurality of real time voice-related data streams within each packet. The protocol provides timing recovery, sequencing and payload identification for the voice-related data streams.

Unlike conventional switched telephone networks, where the switches effectively encode each telephone call instantaneously, timing is more problematic in a system which relies upon a medium such as the Internet. In general, the protocol of the present invention provides delineation, identification, and payload identification, while supporting variable-length blocks which represent groups of one or more frames from individual users, all with relatively low overhead. That is, data from different users is clearly delineated, the channel to which data belongs is clearly identified, and payload type is identified to indicate the codec in use by each user. This arrangement allows for changes in coding type during the lifetime of a channel, for example, when a user changes coding type due to varying congestion levels in the network. By supporting variable length blocks from a particular user, the new system permits the use of variable rate codecs.

In the currently preferred embodiment, the system binds telephone numbers to channel identifiers by signalling through a companion connection before data transmission begins. In the preferred format of FIG. 3, the first three words of a packet 300 constitute an RTP header. The three coherent synchronization count bits, labeled CC in the first word of the RTP header, are set to zero. A marker bit, labeled M, has no significance in this protocol since each block includes its own marker bit in a dedicated header. A field set aside for payload type, labeled PT, includes a number which indicates that the packet conforms to the protocol in accordance with the present invention. The second word of the header, labeled timestamp, indicates the time at which the first sample among all the blocks within the packet was generated.

In this preferred embodiment, each active user is represented by a data block within each packet. A one word header 302 precedes each block of data 304, FIG. 3 shows two blocks of data 304 labeled payload 1 and payload 2, respectively. An ITG parses the blocks until the end of the RTP packet is reached to determine the number of blocks 304 within the packet 300. Each header 302 includes eight bits for channel identification, labeled ID. Since each connection may last for days, weeks, or even months, channel IDs will be re-used as various users initiate and terminate their telephone calls. In order to reduce overhead, the channel ID is kept relatively short. In this preferred embodiment, ID labels 0 to 254 are used as direct identifiers, that is 255 channels are associated with corresponding bit combinations. Channel ID label 255 is reserved as an escape code which permits the header to be expanded in order to expand the length, payload type, or channel ID codings.

When channels are re-used, there is a danger that data from one channel could be routed to another. For example, when one channel is torn down and a new one is immediately set up using the same channel ID, data packets from the old channel may be played out to the new user of the channel ID if the data packets have been significantly delayed within the network. The new system, as illustrated in the flow chart of FIG. 2B, ensures that such misdirection does not occur by supporting a twoway handshake for all control messages. That is, a source cannot re-use a channel identifier until it has received an acknowledge, step 220, from the destination after requesting a channel setup, step 221, that that particular channel was successfully torn down and a source does not begin to send data step 222, from a particular channel in the connection stream until it has received an acknowledge from the destination that the setup is complete. Additionally, when a source sends a teardown message, step 224, it stops sending data, step 228, in the stream for that channel and, in the signalling message, it indicates the sequence number of the packet which contained the last block for that channel, step 226. The sequence number increments by one for each packet. Furthermore, when a receiver receives a teardown message, it checks the highest sequence number received to that point in time, step 230. If that number is greater than the sequence number indicated in the teardown message, the channel is torn down, step 232, and any further blocks containing that channel ID are discarded. On the other hand, if the greatest sequence number received to that point in time is less than the sequence number indicated in the teardown message, blocks from that channel are accepted until the received teardown sequence number exceeds the channel ID number, at which point the channel is torn down and no further blocks with that channel ID are accepted. When a setup message is received, the destination will begin to accept blocks with the given channel identifier, step 236, but only if the sequence numbers of the packets in which they reside is greater than the teardown sequence number, step 234. The use of sequence numbers allows the receiver to separate the old blocks associated with the channel ID from the new blocks associated with the same channel ID. In addition to ensuring that data blocks are not routed to the wrong channel, this approach ensures that the end of a speech sequence will not be clipped if the last data packets arrive after the teardown is received. Each receiver maintains a table of sequence number values for each channel ID.

Alternatively, the source could maintain a linked list of free channel IDs which is initialized to contain all the channel IDs in order. When a new channel is to be established, the channel ID is taken from the top of the list and when the channel is torn down, its ID is placed on the bottom of the list. This maximizes the time between channel ID re-use and reduces the probability of conflict.

In addition to channel ID, each block header 302 also includes eight bits, labeled length, to indicate the number of words in the block. One bit is set aside as a marker bit, labeled M, which indicates the beginning of a talk spurt. Eleven bits, labeled TimeStamp Offset, are set aside within each header to provide an offset in time for each block, relative to the timestamp of the RTP header. The size of the offset field is chosen so that it is capable of indicating the difference in time between the earliest and latest samples within a packet. For example, if one assumes a 125 microsecond ($\mu$s) clock and 200 millisecond (ms) packetization delay, the offset field is set at eleven bits to thereby span the 200 ms with 1600 ticks of the 125 $\mu$s clock. This time stamping approach allows for the recovery of periods of silence and resynchronization in the event of the loss of a packet. The time stamping also allows users to have data in the same packet even if their data is not generated synchronously. Time stamp offsets capitalize on the fact that various blocks are likely to be close to one another to reduce the number of bits required for the time stamp.

Each user within a packet may use a different frame size. For example, user 1 may send a 20 ms frame, user 2 a 10 ms and user 3 a 15 ms frame, and so on, all within the same packet. Additionally, these frames may be arbitrarily aligned, that is, the 20 ms frame may begin 5.3 ms after the 10 ms frame. An ITG may send packets at any point, with the packet containing data from those users whose frames have been generated before the packet departure time. Alternatively, as discussed below in relation to FIG. 5, different frame sizes and time alignments may be supported, but all the frames within a given packet are of the same size and are all aligned in time. That is, the differences are permitted from packet to packet in that packet organization.

Figure 4:
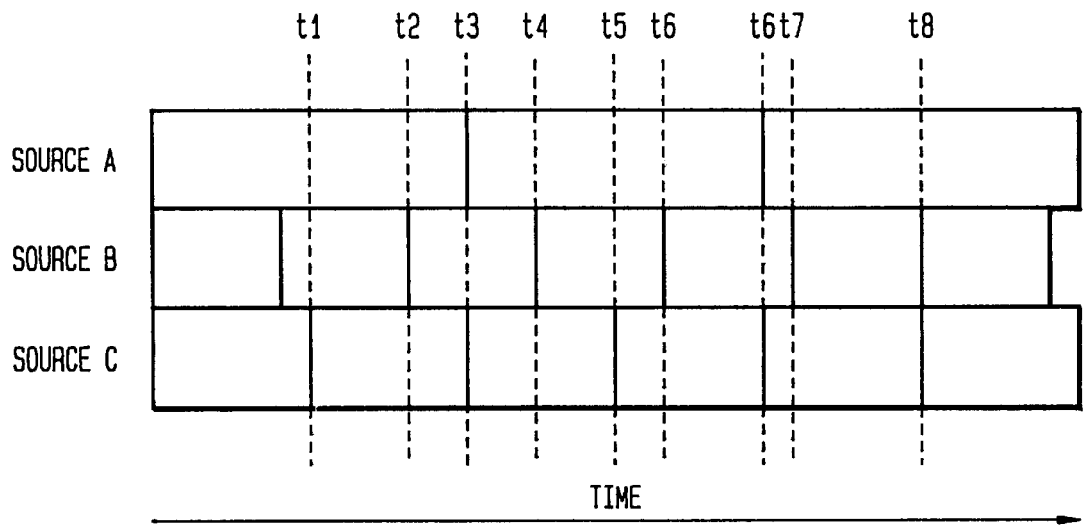
FIG. 4 is a timing diagram illustrating timing issues addressed by the invention.

The timing diagram of FIG. 4 illustrates some of the timing considerations addressed by the new system and its associated protocols. Packets may contain frames from some or all of the users connected at a given time. Timing related to the data sent by three sources, labeled Source A, Source B, and Source C is illustrated in FIG. 4. At various times, labeled t1–t8, packets are sent. For example, two blocks are sent from Source C within the first three packets, that is by time t3, while only one block is sent from Source A and two blocks are sent from source B, within the same time period. If a packet is lost, the variability in the amount and time alignment of data in each packet makes it difficult to reconstruct how much time had elapsed, based solely on sequence numbers. Additionally, jitter and delay computations are complicated by the presence of more than one user, yet such computations are used for RTCP reporting and, possibly, for the estimation of network delays which are, in turn, used in dynamic playout buffering. If blocks are allowed to vary in size, either within a packet or from packet to packet, or if, as indicated by the completion of Source B's first block before time t1 when the first packet is sent, a block is not sent immediately after it is completed, different blocks within a given packet may experience different delay and jitter. In the presently preferred embodiment, adaptive playout buffering is performed separately for each user, which requires the computation and storage of delays for each user. Alternatively, delay estimates based on some measure derived from all the users may be employed. For example, the maximum delay between the arrival time at the receiver and the generation time, as indicated by the block time stamp, may be employed as a conservative delay estimate.

Returning to the discussion of FIG. 3, the payload type identifier, labeled PT, employs four bits to identify the coding of the payload. With the payload type identifier field located along with the payload, the system may effect more robust rate control, an issue when multiple channels are multiplexed together. A table of encodings for the payload type is preferably signalled at the beginning of a connection or may be known a priori. Since any particular pair of ITGs will generally support only a few codecs, dynamically setting the codings of the PT bit makes a more compact representation possible without restricting the set of codecs which may be used.

The preferred embodiment, exemplified by the packet organization of FIG. 3, is able to support multiple frame sizes within a single packet. However, it employs a relatively limited payload type field and it requires a thirty-two-bit header for each payload block. The thirty-two bit header may be burdensome, particularly for low bit rate codecs. An alternative, more compact, packet organization is set forth in the block diagram of FIG. 5, where a sixteen bit block header is employed. The block headers are all contiguously located at the beginning of the packet immediately following the RTP packet header. If the total length of the header fields is not a multiple of thirty-two, the last block header is padded out to thirty-two and fields within the block header do not break across packet boundaries.

This packet organization relies upon the fact that all the blocks in a packet are time-aligned and have the same frame length, thus permitting the elimination of the timestamp offset field which is present in the packet organization of FIG. 3. This restriction does not imply that identical codecs or block sizes must be employed, as many voice codecs operate with a 20 ms or 50 ms frame size. Sequence numbers and frame size completely determine the timing so long as one user is active. A global timestamp which indicates the sample time of the first sample in each block is employed. Since each block has identical timing, the timestamp is the same for each block and therefore, a single timestamp for the entire packet is sufficient for timing recovery.

Figure 5:
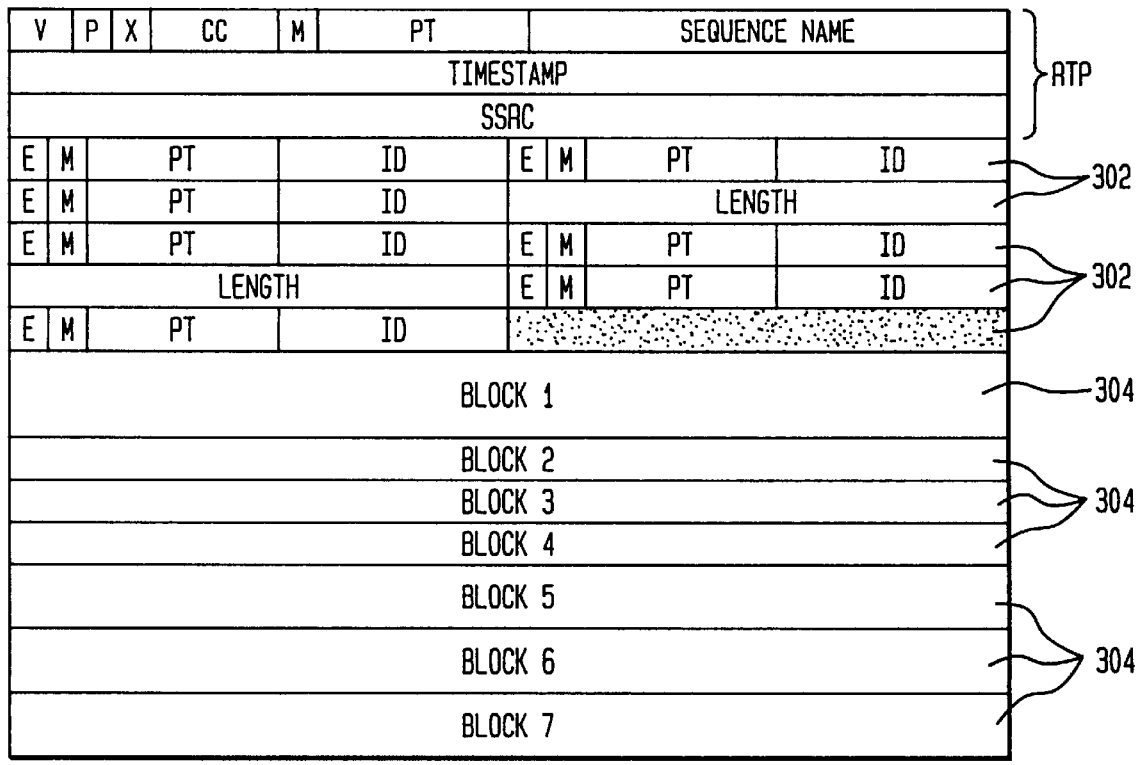
FIG. 5 is a block diagram which depicts an alternative packet format according to the present invention.

In the embodiment of FIG. 5, different sized frames are supported by using a different synchronization source (SSRC) for each frame size in use and sequence numbers are interpreted for each SSRC separately so that, for example, a block which contains all 10 ms frames are placed within a packet with a unique SSRC that is used only with packets having 10 ms frames. Jitter and delay computations are performed for each SSRC separately, thus making jitter and delay estimates more accurate, and multiple jitter, delay, loss, and so on, one for each frame size, are reported to the source. The first three words of the packet constitute the RTP packet header, as previously described. In this embodiment the CC field is always set to zero and the marker bits and payload type are undefined. The timestamp indicates the time at which the first sample of all blocks is generated. The SSRC is different for each frame size, but is randomly chosen so that, for example, 10 ms frames would have a different SSRC than 15 ms frames.

The first bit of each sixteen-bit block header is an expand bit, labeled, E, which, when set, indicates that the sixteen bits immediately following the header indicate the length of the corresponding block. When the expand bit E is clear, the length of the corresponding block is derived from the payload type which could indicate, for example, three 30 ms frames. The six bits following the expand bit indicate the payload type, that is, the type of encoding employed and the remaining eight bits are dedicated to the channel ID. There are seven blocks in the example of FIG. 5. The first two blocks have standard lengths indicated in the PT field. The third block uses the expansion bit to indicate the block length, the fourth uses the PT field, the fifth uses the expansion bit to indicate, for example, four 30 ms frames, and the sixth and seventh use the PT field. The last sixteen bits of the header are padded out to thirty-two bits.

Figure 6:
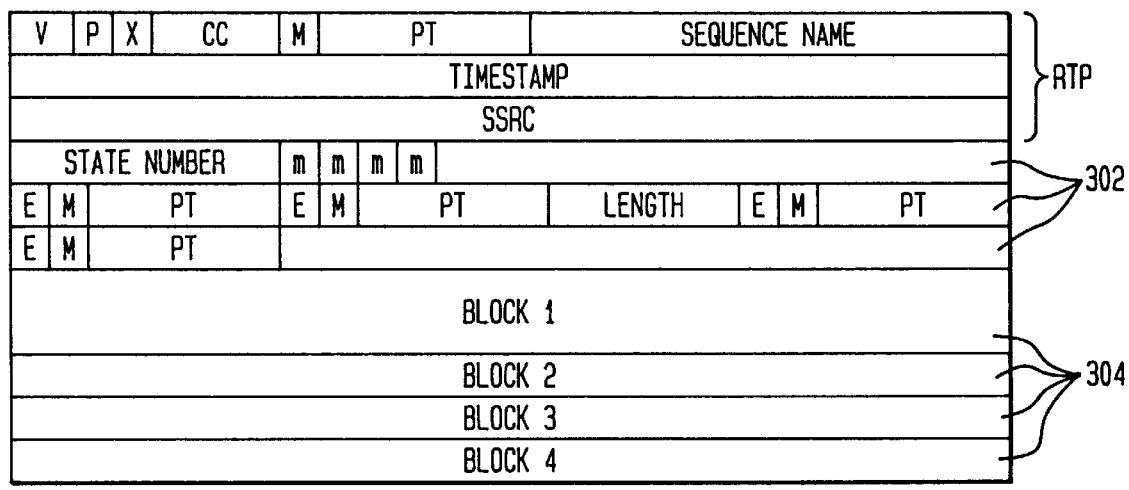
FIG. 6 is a block diagram which depicts another packet format according to the present invention.

In another embodiment, the new system employs packets as illustrated in the block diagram of FIG. 6. This approach is similar to that just discussed in relation to FIG. 5, however, the per-block header is reduced to one byte, with one expansion bit, E, one marker bit, M, and six bits of payload type. When the expansion bit is clear, the length field is only eight bits long, rather than the sixteen bits of the previously discussed embodiment. Not only does this reduce overhead, it also guarantees that fields remain aligned on byte boundaries. The mask bits are located in the beginning of the packet, and are preceded by an eight-bit state number. If the number of active channels is not a multiple of thirty-two, the mask field is padded out to a full word. There are four active channels illustrated in FIG. 6, each of which is present in this packet, consequently, all four mask bits would be set to 1. The first block is of a standard length, and the second has its expansion bit set, so that an eight-bit length field follows immediately. The remaining two blocks are also of a standard length, so that the last twenty-four bits of the header are padded out to a word boundary.

The approach of this embodiment is extremely efficient, but the channel identification procedure is more complex and requires additional signalling support. In this embodiment, the system takes advantage of the fact that both the source and destination know the set of active connections and their channel identifiers from the signalling messages, to reduce the number of bits required to indicate the channel ID. If the blocks are placed in a packet in order of increasing channel ID, very little information need be sent. In fact, without silence suppression, channel activity and the presence of a block in a packet would likely be equivalent. However, silence suppression is used and, even if it were not, it is possible for the voice codecs at the ITG not to have their framing synchronized, so that a packet may not contain the data from all users. Furthermore, the source and destination do not have a consistent view of the state of the system since there is a delay while signalling messages are in transit. Therefore, a mask is sent in the header of each packet, with each bit in the mask indicating whether data from a corresponding channel is present within the packet or not. Channel IDs are mapped to mask bits in increasing order, so that if the lowest channel has no data in the packet, the lowest order bit is set to zero, if the second lowest channel has no data, the second lowest order bit is set to zero, and so on. Since the source and destination agree on the number of active connections at any point in time, both the source and destination are aware of the number of bits required for the mask.

In this embodiment, differences in state are handled by an additional eight-bit field, referred to as a state number field, located in each packet header. The field is initialized to a value of zero but for illustrative purposes, assume that its value is N. If the source wishes to tear down a channel, it sends a tear down message to the destination, but it continues to send data for that channel (if it does not send data, it must set the bit in the bit mask corresponding to that channel to zero). When the destination receives the message, it replies with an acknowledge message. When the acknowledge is received by the source, the source considers the channel torn down, and no longer sends data for it, nor considers it in computing the mask. In the packet where this happens, the source also increments the state-number field to N+1. The destination knows that the source will do this, and will therefore consider the state changed for all packets whose value of the field is N+1 or greater. When the next signalling message takes effect, the field is further increased. Even if packets are lost, the value of the state-number field for any correctly received packet completely tells the destination the state of the system as seen in that packet. Furthermore, it is not necessary to wait for a particular setup or teardown to be acknowledged before requesting another setup or teardown.

The number of bits for the state-number field is set large enough to represent the maximum number of state changes which can have taken effect during a round trip time. An additional exchange may be implemented. After the destination receives a packet with a state number greater than N, it destroys the state related to N, and sends back a free state N message, indicating to the destination that state N is now de-allocated, and can be used again. Until such a message is received, the source does not re-use state N. This is, essentially, a window-base flow control, where the flow is equal to changes in state. With this additional implementation, the number of bits dedicated to the state number can be safely reduced, and the destination will never confuse the state regardless of the number of state-number bits employed. However, the use of too few state bits can cause call blocking or delay the teardown of inactive channels. As another option, the source may send the complete state of the system with each signalling message, along with the state-number field for which the state takes effect. This approach insures that, even in the event of a system failure, if an error in processing or hardware failure at either end causes a loss of synchronization, for example, the system state will be refreshed whenever a new connection is set up or torn down. Additionally, the state may be sent periodically to improve system robustness.

The forgoing description of specific embodiments of the invention has been presented for the purposes of illustration and description. It is not intended to be exhaustive or to limit the invention to the precise forms disclosed. It will be apparent that many modifications and variations are possible in light of the above teachings. For example, the bus connections, and the separation of functions illustrated in FIG. 2 need not be as illustrated. Additional buses, or other I/O ports may be employed to accelerate communication among the individual functional units. The invention may be used in the context of other packet networks, such as the connection of PBXs or voice access switches. The embodiments were chosen and described in order to best explain the principles of the invention and its practical application, to thereby enable others skilled in the art to best utilize the invention. It is intended that the scope of the invention be limited only by the claims appended hereto.

What is claimed is:

1. A voice communication system, comprising:
   a plurality of telephone sets connected to termination equipment which terminates said plurality of telephone sets, and
   respective packet network telephone gateways connected to said termination equipment and to a packet network whereby said packet gateways are connected to multiplex voice telephone calls among said plurality of telephone sets to a single transport level connection with information from a number of voice telephone calls multiplexed into a single packet, wherein said packet network is the Internet;
   said packet network telephone gateways operate to establish a packet network connection in response to a request from a user associated with one of said telephone sets and said gateways establish a channel for each user within each said transport level connection;
   said packet network telephone gateways operate to digitize voice signals from said telephone sets, to multiplex blocks of such digitized voice signals onto a transport level connection, and to packetized said multiplexed voice signals;
   said telephone gateways are connected to provide channel identification for each said channel; and
   said telephone gateways are further connected to send sequence numbers in setup and teardown messages to allow for re-use of channel identifications.

2. The system of claim 1, wherein said telephone gateways are connected to derive the length of a payload block from payload type information included within a packet header.

3. The system of claim 2, wherein said telephone gateways are connected to indicate a channel ID with a binary bitmask representation of a particular channel corresponding to a user.

4. The system of claim 3, wherein said binary representation includes an escape bit to permit an expansion of the number of channel identifications.

5. The system of claim 4, wherein said Internet telephone gateways are connected to employ a bitmask to indicate the presence or absence of a channel within a packet.

6. The system of claim 5, wherein said Internet telephone gateways employ a counter to synchronize the interpretation of said bitmask.

7. The system of claim 6, wherein said telephone gateways employ a timestamp offset to indicate the timing of block of data associated with each channel, said timestamp offset being relative to an absolute timestamp.

8. The system of claim 7, wherein each said packet contains a single timestamp value that is valid for all the channels having data blocks within the packet, and each packet includes a unique identifier, with the identifier being the same in two packets along the same timestamp sequence.

9. The system of claim 8, wherein said binary representation employs eight bits.

10. The system of claim 8, wherein said binary representation includes an escape bit to permit an expansion of the number of channel identifications.

11. The system of claim 8, wherein said Internet telephone gateways are connected to employ a counter to update the association of a channel with system users.

* * * * *